United States Patent [19]

Lavengood et al.

[11] Patent Number: 4,777,211
[45] Date of Patent: Oct. 11, 1988

[54] RUBBER-MODIFIED NYLON COMPOSITION

[75] Inventors: Richard E. Lavengood, Longmeadow, Mass.; Raman Patel, Akron, Ohio; Allen R. Padwa, Worcester, Mass.

[73] Assignee: Monsanto Company, St. Louis, Mo.

[21] Appl. No.: 881,014

[22] Filed: Jul. 9, 1986

Related U.S. Application Data

[63] Continuation-in-part of Ser. No. 767,944, Aug. 21, 1985, abandoned.

[51] Int. Cl.$^4$ ............................................. C08L 77/00
[52] U.S. Cl. ..................................... 525/66; 525/179; 525/902
[58] Field of Search ........................ 525/66, 183, 179

[56] References Cited

U.S. PATENT DOCUMENTS 4,554,320 11/1985 Reimann et al. .................... 525/183

FOREIGN PATENT DOCUMENTS 3120803 12/1982 Fed. Rep. of Germany ........ 525/66
54-48850 4/1979 Japan .

Primary Examiner—John C. Bleutge
Assistant Examiner—A. Carrillo
Attorney, Agent, or Firm—Linda L. Lewis; R. Bruce Blance; Thomas E. Kelley

[57] ABSTRACT

A polyamide composition of improved impact resistance comprising a blend of components (A) a graft polymer of a (meth)-acrylate and/or (meth)-acrylonitrile and a vinylaromatic monomer grafted onto a substrate rubber, (B) a polyamide resin, (C) an acid-containing acrylate copolymer rubber and (D) an effective amount of an acid-containing polymer to improve the impact resistance of the polymer blend.

16 Claims, No Drawings

RUBBER-MODIFIED NYLON COMPOSITION

This Application is a continuation-in-part of application Ser. No. 767,944, filed Aug. 21, 1985.

This invention relates to thermoplastic polyamide polyblends and more particularly to impact resistant polyamide polyblends.

Unmodified thermoplastic polyamides are generally regarded as having good elongation and good energy to break as demonstrated in tensile tests and high tensile impact strength and high energy absorption as demonstrated in a falling dart test, e.g, the Gardner impact test. However, the polyamides are quite deficient in resistance to crack propagation. This deficiency is reflected in notch sensitivity, brittle breaks and occasional catastrophic failure of molded extruded parts. The tendency of polyamides to break in a brittle rather than a ductile fashion is a significant limitation of their end use applications.

A variety of additives have been added to polyamides with some improvement in toughness being obtained. Epstein (U.S. Pat. No. 4,174,358) discloses a toughened multiphase thermoplastic composition consisting essentially of a polyamide matrix and at least one other phase containing straight-chain and branched-chain polymers having a particle size in the range of 0.01 to 1.0 micrometers, which adhere to the polyamide matrix resin and which also have tensile modulus in the range of about 1.0 to 20,000 psi (0.0069 to 137.8 MPa).

German Patent Publication DE No. 3120-803 discloses thermoplastic polyamide molding compositions comprising a polyamide, a graft rubber composition, styrene-acrylonitrile copolymer and a styrene copolymer with 2 to 50 weight percent of carboxylic acid and/or anhydride groups. Such compositions provide some increase in Izod impact of a nylon composition, however, the improvements are less than can be achieved with the present invention.

Baer (U.S. Pat. No. 4,306,040) teaches a multiphase core//shell polymer comprising a crosslinked elastomer core and a rigid thermoplastic polymer shell comprising a monoalkyl maleate or fumarate, styrene and acrylonitrile useful for blending with polyamides to provide toughened polyamide compositions. Unlike the present invention in which the ABS is merely blended with an acid-functionalized polymer, Baer's core//shell polymer requires that the rigid thermoplastic polymer shell around the elastomer core be functionalized with acid monomer and grafted to the core. Furthermore, Baer fails to recognize the improvement in impact resistance of nylon blend compositions when acid-containing acrylate copolymers are added to the blend.

It is also known that polyblends can be prepared from polyamides and graft copolymers such as ABS graft copolymer using a hard copolymer containing a rather low concentration of functionalized monomer as a compatibilizer to provide toughened polyamide compositions. It has now been discovered that polyblends of enhanced toughness can be obtained from polyamides and graft polymers such as ABS graft copolymer using a compatibilizing system comprising a soft rubbery acid-functionalized copolymer and a hard acid-functionalized copolymer.

The present invention provides a polymeric composition or polyblend and molded or extruded parts prepared from the polyblend composition, wherein the polyblend comprises:

(A) a graft polymer component comprising from 5 to 80 weight percent of a substrate rubber having a glass transition temperature below 0° C. and from 95 to 20 weight percent of monomers comprising per 100 parts by weight of monomers from 20 to 75 parts by weight of a vinyl aromatic monomer and from 80 to 25 parts by weight of a monomer selected from the group consisting of $C_1$ to $C_4$ alkyl (meth)-acrylate and (meth)-acrylonitrile, said monomers having been polymerized in the presence of and grafted on to the substrate rubber;

(B) a polyamide;

(C) an acid-containing acrylate copolymer rubber having a glass transition temperature below 0° C.; and (D) an effective amount of an acid-containing polymer to improve the impact resistance of the polymer blend comprising components (A), (B) and (C), said acid-containing polymer having a glass transition temperature above 0° C. and containing from about 0.1 to about 50 mole percent of acid functional comonomer units;

wherein the weight ratio of component (A) to component (B) is in the range of about 1:9 to about 9:1, wherein the sum of components (A) and (B) is at least about 60 weight percent of the polymer blend and wherein the amount of component (C) is in the range of 1 to 18 weight percent of the polymer blend.

Component (A) is typically an ABS or MBS type polymer, that is to say a diene rubber substrate grafted with a vinylaromatic monomer and either (meth)-acrylonitrile or a $C_1$ to $C_4$ alky (meth)-acrylate, or a mixture of these monomers. Preferred monomers are acrylonitrile and methyl methacrylate. The rubber component is conventionally a diene rubber or hydrogenated diene rubber such as polybutadiene, hydrogenated polybutadienea polymer of butadiene with a comonomer such as styrene or acrylonitrile which rubber contains at least 50 percent and preferably 80 percent by weight of butadiene or a butadiene-based block or radial-block polymer. However the rubber need not be the conventional polybutadiene or butadiene/styrene copolymer since any rubber with a glass transition temperature below 0° C. such as EPDM rubber, polypentenamer, polyisoprene, polychloroprene, polyacrylate rubbers and the like can be used. The glass transition temperature is conveniently measured by differential thermal analysis by heating a rubber sample under nitrogen at a rate of 10° C. per minute. Preferably if the rubber is a polyacrylate, it contains a minor amount, up to 5 weight percent of an interpolymerized monomer such as allyl acrylate to provide unsaturation and enhance grafting thereto.

Vinylaromatic monomers used for the graft copolymer of component A include styrene, and substituted styrenes such as alpha-methyl styrene chlorostyrene, bromostyrene, p-methyl styrene, and vinyl toluene. The weight ratio of vinylaromatic monomer to comonomer in the graft copolymer of component A is preferably in the range of 75:25 to 20:80 and the weight percent of the rubber is in the range of 5 to 80 percent of the total weight of the graft rubber composition and more preferably 5 to 60 percent. When the vinylaromatic monomer is styrene and the comonomer is acrylonitrile, a more preferred weight ratio of styrene to acrylonitrile is in the range of 75:25 to 50:50. The ratio of comonomers of the graft copolymer is preferably selected so that the ungrafted copolymer fraction has a tensile modulus of at least 25,000 psi (417 MPa), more preferably in the range of about 150,000 to 250,000 psi (1,034 to 1,723 MPa). Advantageously graft polymerization conditions are selected to provide a graft copolymer fraction, i.e., graft efficiency of at least 20 weight percent and preferably at least 40 weight percent of the total copolymer present in the graft rubber composition, and provided the grafted copolymer fraction is maintained above 20 weight percent, the graft rubber composition may be diluted by addition of separately prepared copolymer of vinyl aromatic monomer and comonomer selected from the group consisting of acrylonitrile, methacrylonitrile, $C_1$ to $C_4$ alkyl acrylates and $C_1$ to $C_4$ alkyl methacrylates. Graft polymerization conditions are advantageously selected to provide a copolymer of weight average molecular weight less than 200,000 and preferably less than 150,000 measured on the ungrafted fraction by gel permeation chromatography as hereinafter described. The particle size of the rubber graft composition is advantageously in the range of 0.05 to 1.0 microns, preferably in the range of 0.1 to 0.5 microns, measured as a weight average particle size diameter by centrifugal photosedimentometer.

Component (B) is a polyamide such as nylon 6 or poly(caprolactam), nylon 11 or poly(11-aminoundecanoic acid), nylon 12 or poly(lauryl lactam) or poly(12-aminododecanoic acid), nylon 6,6 or poly(hexamethylene adipamide), nylon 6,9 or poly(hexamethylene azelamide) or poly(hexamethylene nonandiamide), nylon 6,10 or poly(hexamethylene sebacamide) or poly(hexamethylene decanediamide), nylon 6,12 or poly(hexamethylene dodecanoamide), nylon 4 or poly(ω-butyrolactam), nylon 7 or poly(7-aminoheptanoic acid) or poly(7-aminooenanthylic acid), nylon 8 or poly(8-aminocaprylic acid) or poly(8-aminooctanoic acid), nylon 10,6 or poly(decamethylene adipamide) and numerous partially aromatic nylons (PARNs). PARNs result when an aromatic residue or unit is substituted in whole or in part for an aliphatic residue or unit in an aliphatic nylon polymer. For example, substitution of all of the adipic acid [HOOC—$(C_2)_4$—COOH] residues in nylon 6,6 by those from mixtures of about 30–60 percent terephthalic acid (TA, or p—HOOC—$C_6H_4$—COOH)/70–40 percent isophthalic acid (IA, or m—HOOC—$C_6H_4$—COOH) gives suitable PARNs which are high-melting, partly crystalline nylons 6,TA-co-6,IA or poly(hexamethylene tere-co-isophthalamides). Other suitable PARNs are partly crystalline nylons 6,6-co-6,-TA, nylons 6,6-co-6,IA, nylons 6,6-co-6,-TA-co-6,IA, and other similar PARNs, including partly crystalline PARNs wherein some of the diamine residues have aromatic character and those containing lactam residues, such as nylons 6-co-6,6-co-6,TA.

Also suitable are various types of copolyamides, block copolymers, and graft copolymers. The preferred polyamide resin is selected from the group consisting of nylon 6, nylon 6,6, nylon 6,9 and a random copolymer of nylon 6,6 and nylon 6.

The molecular weight of the polyamide is advantageously selected in the range of 5000 to 35,000 number average, preferably 8000 to 20,000 to provide polyamide compositions which can be readily molded by injection or extrusion techniques.

Polyamides are generally neither miscible nor compatible with hydrocarbon polymers such as polystyrene and ABS. In the generally accepted sense, two polymers are miscible when they form a single phase, solid solution. Miscibility of a blend of polymers may be confirmed by a single Tg for the polyblend, measured by calorimetry or dynamic mechanical analysis, or by optical clarity of the polyblend. When two polymers exhibit different Tgs or loss tangent peaks, they demonstrate immiscibility by forming two phases in a blend, each of which retains the Tg or loss tangent peak of one of the pure components. Partially miscible blends exhibit shifted or broadened loss tangent peaks relative to the individual pure components. When two polymers are compatible, a mixture provides a stable blend possessing a useful balance of mechanical properties exhibited especially by impact strength or tensile elongation to fail equal or superior to such properties for the component which provides the continuous phase in the mixture. By contrast, when two polymers are incompatible, the mixture exhibits generally poor mechanical properties, especially impact strength or tensile elongation to fail, which are lower than for the component which provides the continuous phase in the mixture. Incompatibility may be manifested during processing, for example, molding and extrusion, by extensive phase separation resulting in layering of the polymers and delamination under mild stress.

The present invention yields blends of polyamides and graft polymer of the ABS type that form compatible mixtures, i.e., stable mixtures comprising a micro dispersion of a minor amount of one polymer in a continuous phase of a major amount of the other and results in polymer blends of generally improved balance of mechanical properties especially toughness demonstrated by higher impact strength and elongation to fail. When about equal amounts of polyamide and ABS are blended, uniformly interspersed coextensive phases are formed in the mixture which also possesses generally improved, mechanical properties. To a limited extent compatible blends of polyamides and grafted rubbers, such as ABS, are obtained by the use of an acid-modified acrylate copolymer rubber (Component C).

Component (C) is typically an acid-containing acrylate copolymer rubber wherein the acid group is capable of reaction with the polyamide through its terminal amine groups, and has a glass transition temperature (Tg) below room temperature, preferably below 0° C. Suitable acid-containing acrylic copolymer rubbers comprise rubbery ethylenically unsaturated carboxylic acid-acrylic ester copolymers. The rubbers of the invention contain about 0.5 to 25 mole percent of an interpolymerized acid-containing monomer such as acrylic or methacrylic acid or $C_1$ to $C_{12}$ monalkyl esters of diacids such as monomethyl maleate and mono-dodecyl fumarate, a dicarboxylic acid such as fumaric acid, maleic acid, itaconic acid, aconitic acid or citraconic acid, an anhydride, such as maleic, itaconic, aconitic or citraconic anhydride. They are distinguished by their acid functionality from polyacrylate rubbers which generally are essentially non-functionalized acrylic ester polymers. Suitable rubbers include acrylic acid-acrylic ester-alpha-olefin terpolymers which are essentially non-crystalline and have glass transition temperatures (Tg) below room temperature preferably below 0° C. The rubber may be prepared by partial hydrolysis of an acrylate-olefin copolymer rubber to obtain the required acid groups. Suitable copolymer rubbers are preferably prepared by polymerization of a $C_1$ to $C_{10}$ alkyl acrylate, an alpha-olefin of 2–8 carbon atoms and an acid monomer selected from the group consisting of acrylic acid, methacrylic acid and $C_1$ to $C_4$ monalkyl ester of maleic and fumaric acids. Preferred rubbers are polymers of ethylene, $C_1$–$C_4$ alkyl acrylate and monoethyl maleate or acrylic acid. More preferred acid functional rubbers are polymers comprising at least 50 mole percent of ethylene, about 10 to 49.5 mole percent $C_1$ to $C_4$ alkyl acrylate, and about 0.5 to 10 mole percent monoethyl maleate or acrylic acid and contribute to significantly enhanced impact properties in the polyblends.

The acrylate copolymer rubber is effective to improve impact resistance in the blend in the range of about 1 to about 18 weight percent. The preferred amount of acrylate copolymer rubber in the blend is from 5 to 15 weight percent, and the most preferred amount is 5 to 10 weight percent acrylate copolymer rubber to provide enhanced impact properties.

Although only a limited degree of toughening is obtained when the acid-containing acrylate copolymer rubber is added to the blend of graft copolymer of the ABS type, a further addition of an acid functional hard copolymer (component (D)) is found to significantly enhance the impact strength of the polyblend. Thus component (D) acts together with component (C) to provide an efficient compatibilizing system for blends of polyamide (component (B)) and graft copolymers of the ABS type (component (A)).

In the present invention, the structure of the D component compatibilizer is such that it meets several criteria:
1. the compatibilizer is at least partially miscible and preferably fully miscible with the graft copolymer of the grafted rubber component A;
2. the compatibilizer contains acid functional groups capable of reacting with the amine end groups of the polyamide. The amount of functional acid groups provided by component (D) is rather small.

Component (D) is typically a copolymer of a vinylaromatic monomer of the type in component (A) copolymerized with an acid functional monomer and optionally a monomer selected from the group consisting of acrylonitrile, methacrylonitrile, a $C_1$ to $C_4$ alkyl methacrylate, a $C_1$ to $C_4$ alkyl acrylate in a weight ratio of vinylaromatic monomer to comonomers in the range of 85:15 to 15:85. Preferred optional monomers are (meth)-acrylonitrile and methyl (meth)-acrylate. Advantageously component (D) has a number average molecular weight of at least about 10,000 and preferably at least about 21,000 and a weight average molecular weight of at least about 20,000 and preferably at least about 40,000. The molecular weights are conveniently measured by gel permeation chromatography as described hereinafter. While in principle the molecular weight can be extremely high, it is advantageous to have a weight average less than 200,000 to provide ease of processing and blending with the other components of the polyblend and preferably less than 100,000. Component (D) contains from about 0.05 to about 50.0 mole percent of a copolymerized comonomer containing an acid group capable of reacting with the amine of the polyamide. Preferably the acid monomer concentration is in the range of 0.1 to 30 mole percent of component (D). The acid group is provided by a monomer such as acrylic or methacrylic acid or $C_1$ to $C_{12}$ monalkyl esters of diacids such as monomethyl maleate and mono-dodecyl fumarate, a dicarboxylic acid such as fumaric acid, maleic acid, itaconic acid, aconitic acid or citraconic acid, or an anhydride, such as maleic, itaconic, aconitic or citraconic anhydride.

The effective amount of component (D) in the blend is from about 0.006 weight percent to about 39 weight percent. Advantageously, the amount of component (D) lies in the range of 0.05 to 20 weight percent of the polyblend. The actual amount of component (D) effective to improve the impact strength of the blend depends on the concentration of the acid functional groups in the blend. The higher the concentration of acid functional groups, the lower is the effective amount of component (D) in the blend. An excessive amount of component (D) or an excessive amount of acid functional group of component (D) may be detrimental to the impact strength of the blend. An effective amount of acid functional monomer units of component (D) in the blend lies in the range of about 0.00003 to about 0.005 mole per 100 parts by weight of polyblend.

Sufficient miscibility of component (D) with the graft copolymer fraction of the graft rubber composition of component (A) to provide effective compatibilizer activity is generally obtained when the sum of the weight percent ($W_1$) of acid monomer and the weight percent ($W_2$) of the polar monomers, viz. acrylonitrile, methacrylonitrile and $C_1$ to $C_4$ alkyl (meth)acrylate of component (D) is at least 15 weight percent of component (D) and is equal to the weight percent ($W_3$) of the polar monomers, viz. acrylonitrile, methacrylonitrile and $C_1$ to $C_4$ alkyl (meth)-acrylate of the graft copolymer fraction of component (A) ±12 percentage units. Thus $W_1 + W_2 = W_3 \pm 12$. A more preferred range for miscibility is ±7 percentage units. Preferably except for the acid comonomers of component (D), the monomers of component (D) are identical to the monomers of the graft copolymer fraction of component (A).

A preferred component D is a terpolymer containing styrene, and from about 0.1 to about 3.0 mole percent maleic anhydride or $C_1$ to $C_4$ monoalkyl maleate or fumarate. With such a terpolymer complete miscibility with the graft copolymer fraction of the rubber graft component A is obtained when the graft copolymer also comprises acrylonitrile in a mole concentration within ±7 percentage units of the mole concentration of acrylonitrile and acid functional monomer of component D. Preferably the acid functional monomer is maleic anhydride present in a concentration of about 1 mole percent of the terpolymer. Another preferred component (D) is a terpolymer containing styrene, methyl methacrylate and maleic anhydride in the range of about 15 to 25 mole percent and more preferably about 22 mole percent.

Component (D) typically has a tensile modulus in the range of 350,000 to 450,000 psi (2,410 to 3,100 MPa).

In addition to the above components the polyblends of the invention can advantageously contain other additives such as plasticizers, antioxidants, stabilizers, flame-retardants, fibers, mineral fibers, fillers, dyes, pigments and the like.

The components of the polyblend can be blended together by any convenient process. Usually however they are extrusion blended.

The invention is now described with reference to the following examples which are for the purposes of illustration only and are not intended to imply any limitation on the scope of the invention. The components described below are blended in a number of different ratios and tested for various properties. Parts and percentages are by weight unless indicated otherwise.

ABS-1—prepared by the graft emulsion polymerization of styrene and acrylonitrile in a weight ratio of 70:30 in the presence of polybutadiene-acrylonitrile (93:7) copolymer. ABS-1 contains 40 percent by weight of polybutadiene-acrylonitrile copolymer of which about 4 percent by weight is ungrafted. The weight average molecular weight of the free SAN in the styrene/acrylonitrile graft polymer is in the range from 75,000 to 150,000 as determined by gel permeation chromatography (GPC) using ASTM Method D 3536-76 modified in that four columns in series using micro Styragel TM (a trademark of Waters Assoc.) packing are used with a nominal exclusion limit of 5,000 nm, 10,000 nm, 100,000 nm and 1,000,000 nm. The detector is an ultraviolet light detector set at wavelength 254 nm. The test samples are prepared at a concentration of 0.25 weight percent of polymer in tetrahydrofuran. The sample injection size is 0.2 ml and a flow rate of 2 ml/min. at ambient temperature is used.

The grafted polybutadiene has an average particle size in the range of from 0.1 to 0.25 micrometer measured as a weight average particle size diameter with centrifugal photosedimentometer (CPSM) by the published procedure of Graves, M. J. et al "Size Analysis of Subsieve Powders Using a Centrifugal Photosedimentometer", British Chemical Engineering 9:742–744 (1964). A Model 3000 Particle Size Analyzer from Martin Sweets Co., 3131 W. Market St., Louisville, KY is used. The tensile modulus of ABS-1 is about 220,000 psi (1,515.8 MPa).

ABS-2 is prepared by the graft emulsion polymerization of styrene and acrylonitrile in a weight ratio of 80:20 in the presence of polybutadiene-styrene (90:10) copolymer, and contains 35 percent by weight butadiene-styrene copolymer. The grafted copolymer has an average particle size in the range 0.06 to 0.15 micrometer as measured by CPSM as described above. The tensile modulus of ABS-2 is about 1,515.8 MPa.

ABS-3 is a 60:40 mixture of ABS-1 and a grafted composition which is the same as ABS-1 except that the average particle size is in the range of 0.06 to 0.15 micrometer as measured by CPSM. The tensile modulus of ABS-3 is about 1,515.8 MPa.

ABS-4—the same as ABS-1 except that the ungrafted rubber is omitted, and only grafted polybutadiene is present. The tensile modulus of ABS-4 is about 1,515.8 MPa.

Nylon-1—a random copolymer of 85 weight percent nylon 6,6 polymer (poly[hexa-methylene adipamide]) and 15 weight percent nylon 6 polymer (polycaprolactam).

Nylon-2—a nylon 6,6 polymer.

Nylon-3—a random copolymer of 76 weight percent nylon 6,6 polymer and 24 weight percent of nylon 6 polymer.

Nylon-4—a nylon 6 polymer.

Nylon-5—a heat stabilized nylon 6,9 polymer.

Terpolymer-1—a terpolymer prepared by polymerizing a monomer mixture to provide a polymer containing a weight ratio of styrene to acrylonitrile of about 68:32 and a varied amount of maleic anhydride (MA). The weight average molecular weight is in the range from about 60,000 to 100,000 measured by GPC as described above. The tensile modulus of Terpolymer-1 is about 400,000 psi (2,756 MPa).

Terpolymer-2—a terpolymer prepared by polymerizing a monomer mixture of styrene, maleic anhydride and methyl methacrylate to produce a composition in which the above monomers are in the weight ratio of 72:22:6 respectively (22 mole percent maleic anhydride). The tensile modulus of Terpolymer-2 is about 400,000 psi (2,756 MPa).

Copolymer-1 is a copolymer of styrene and maleic anhydride containing 8 weight percent of maleic anhydride, sold by Arco under the trademark Dylark 232.

Rubber-1—a terpolymer of about 73 mole percent of ethylene, about 26 mole percent methyl methacrylate and about 1 mole percent of monoethyl maleate sold as Vamac TM G rubber (a trademark of DuPont).

Rubber-2—a thermoplastic copolyetherester elastomer which is a block copolymer of short-chain diol terephthalate and long-chain polyether diol terephthalate available from DuPont Company, Elastomer Chemicals Department, Wilmington, Del. 19898 as Hytrel TM 5556 (a trademark of DuPont). This material comprises about 60% by weight of hard segments of polybutylene terephthalate and about 40% by weight of soft segments of polytetramethylene ether terephthalate. Rubber-3—a zinc neutralized ethylene/acrylic acid copoloymer sold as Surlyn TM Ionomer 9950 (a trademark of DuPont). Rubber-4—a terpolymer of butyl acrylate/ethyl acrylate/hydroxy ethyl acrylate in a ratio of 79/20/1 weight percent sold as Hycar TM 4004 (a trademark of Goodrich).

Rubber-5—an impact modified nylon comprising about 74 weight percent nylon 6,6, about 24 weight percent Rubber-4, and about 2 weight percent maleic anhydride/octadecene copolymer in a weight ratio of 50:50. The amount of rubber added to the blend is back-calculated and is shown as Rubber-5 in the table. The back-calculated nylon portion is added to the amount of Nylon-1 shown in the table.

Rubber-6—an impact modified nylon comprising 80 weight percent nylon 6,6 and 20 weight percent maleated EPDM rubber. The amount of rubber added to the blend is back-calculated and is shown as Rubber-6 in the table. The back-calculated nylon portion is added to the amount of Nylon-1 shown in the table.

Rubber-7—EPDM rubber.

Rubber-8—Maleated EPDM rubber containing about 2 weight percent maleic anhydride functionality.

Rubber-9—a terpolymer of ethylene/alkylacrylate/maleic anhydride sold as Lotader TM LX-4110 (a trademark of CdF Chemie).

Rubber-10—a terpolymer of ethylene/alkyl acrylate/maleic anhydride sold as Lotader TM HX-8140 (a trademark of CdF Chemie).

Rubber-11—a terpolymer of ethylene/alkyl acrylate/maleic anhydride sold as Lotader TM AX-8040 (a trademark of CdF Chemie).

Rubber-12—a mixture of 100 parts Rubber-1 with 23 parts of fumed silica, stabilizers and processing aids sold as Vamac TM N-123 (a trademark of DuPont).

In each example and control example, one percent Ethanox TM 330 antioxidant, an alkylated phenol available from Ethyl Corporation, is added based on the total weight of the sample. All test specimens are "dry as molded", i.e. the polymers are dried to less than 0.25 weight percent water in the nylon phase and molded and tested.

Izod impact strength is measured according to ASTM D-256-56 with results given in joules/meter (J/m). Unless otherwise indicated the Izod is measured at room temperature on specimens of 0.64 cm width.

Flexural Modulus is measured according to ASTM D-790-66. The sample size is 0.635 cm × 1.27 cm with a span of 10.16 cm and a 1.27 cm per second cross-head rate. The results are given in megapascals (MPa).

Tensile Yield and Elongation at Fail are measured according to ASTM D-638 with results given in megapascals (MPa) and percent, respectively.

Blows to Fail are measured according to ASTM D-256-56 which has been modified such that the pendulum is dropped at an indicated energy insufficient to break the sample with one blow. The number of blows at that energy required to completely break the samples is the number of blows to fail.

The polymer blends of each example are physically blended by an extrusion process. This involves a preblending step of physically mixing the ABS, terpolymer, rubber and antioxidant and feeding the mixture into a Banbury intensive mixer, Model #69A4782. The rotors are run at about 100 revolutions per minute (RPM) with water cooling. When the stock temperature reaches 199° C., the batch is dumped. The material is sheeted on a two-roll mill, diced, and dried about 16 hours at 60° C. and 98 Newtons/m².

The pelletized preblended material of each example is then physically mixed with the nylon and the mixture fed into the Killion extruder possessing a single stage mixing screw (3.8 cm in diameter by 68.6 cm long) which is rotated at about 100 RPM. The rear zone of the extruder is heated to 254° C. with the middle and front zones heated to 260° C. The extruder is connected to a die with a single 0.318 cm diameter orifice through a 0.04 cm to 0.06 cm opening screen pack. The die is heated to 254° C. The extruded material is passed through a water bath and pelletized by a Kissam TM pelletizer. The rate of extrusion is 7.26 kgs per hour. The pelletized blended material is then injection molded into specimen bars for testing according to the procedures as set forth above with the testing results concurrently listed for each example in Tables 1 to 9. The injection molding is conducted using a 28.3 g Arburg 200 "S" Allrounder TM molding machine available from Arburg Machinenfabrik in Wurttemburg, Germany, possessing a general purpose screw with a check ring and a straight-through nozzle. The molding conditions are as follows:

| 1. | Temperatures: | Rear Zone | 260° C. |
| --- | --- | --- | --- |
|  |  | Center Zone | 260° C. |
|  |  | Front Zone | 260° C. |
|  |  | Nozzle | 260° C. |
|  |  | Mold | 43° C. |
| 2. | Screw Speed: | 94 rpm |  |
| 3. | Injection Rate: | 1.3 seconds |  |
| 4. | Hold and Cooling Times: | 25–35 seconds |  |
| 5. | Hydraulic Pressures: | Injection | 5512 kPa |
|  |  | Hold | 4823 kPa |
|  |  | Back | 344 kPa |

Example 1 and Controls 1 to 7, shown in Table 1, illustrate the effect of varying the rubber composition on the Izod impact value of the blend. The only blend with an unexpectedly high Izod of 1092 J/m is a blend comprising an acid containing acrylate copolymer (e.g. Example 1).

Examples 2 to 5, shown in Table 2, show the effectiveness of different acid-containing acrylic copolymer rubbers in the blend on Izod. All of the rubbers give polyblends possessing high Izod impact values.

Examples 6 to 10, shown in Table 3, show the effect of different nylon compositions in the blend on Izod, tensile yield and flexural modulus. A wide variety of nylon compositions are shown to be suitable for this blend.

Examples 11 to 13 and Controls 8 and 9, shown in Table 4, show the effect of varying the amount of functionalized rubber in the blend on the toughness of the blend, measured by number of blows to fail. An effective amount of rubber includes the range of 5 to 15 weight percent functionalized rubber in the blend.

Examples 14 to 19 and Controls 10 and 11, shown in Table 5, show the effect on Izod value of increasing the amount of functionalized rubber and decreasing the amount of ABS polymer to maintain a constant rubber level of 20 weight percent in the blend. A high level of impact strength is obtained when the functionalized rubber is in the range of 6 to 15 weight percent of the polyblend.

Examples 20 to 22 of Table 6 show that at constant nylon and compatibilizer content, a high level of impact strength is obtained over a broad concentration range of functionalized rubber.

Examples 23 to 26, shown in Table 7, show the effect of varying the ABS composition in the blend on Izod value of the blend. Control 12 (ABS-2) shows that when the acrylonitrile content of the graft copolymer fraction of the ABS polymer is less than about 25 weight percent, improved impact strength is not observed.

Examples 27 to 35 and Control 13, shown in Table 8, illustrate the effect of varying the amount of terpolymer in the blends on Izod value of the blends. A wide range of terpolymer amounts (0.5 to 10.0 weight percent) corresponding to 0.00006 to 0.0011 mole maleic anhydride per 100 parts by weight of polyblend is effective to enhance impact strength.

Examples 33 to 37 and Control 14, shown in Table 9, show the effect of the amount of maleic anhydride in the terpolymer on the Izod value of the blends. A wide range (0.18 to 4.5 mole percent maleic anhydride) corresponding to 0.00006 to 0.0017 mole maleic anhydride per 100 parts by weight of polyblend is shown to be effective in the blend to enhance impact strength.

Examples 38 to 42 and Controls 15 and 16, shown in Table 10, also show the effect of varying the amount of MA in the terpolymer and varying the amount of terpolymer in the blend. Terpolymers containing 22 mole percent MA are effective in low concentrations (less than 3.0 weight percent) in the blend providing concentrations of maleic anhydride in the range of 0.0002 to 0.003 mole per 100 parts by weight of polyblend (Examples 42–45). Similar results would be observed in blends containing a 50/50 weight percent copolymer of styrene/maleic anhydride.

Examples 46 to 49 and Controls 17 to 19 show that when the weight percent of polar monomer (acrylonitrile) and acid functional monomer (maleic anhydride) of component (D) is less than about 15, the impact strength of the polyblend is less responsive to improvement by addition of component (D).

TABLE 1

| | EFFECT OF VARYING RUBBER COMPOSITION | | | | | | | |
| --- | --- | --- | --- | --- | --- | --- | --- | --- |
| | Ex 1 | Control 1 | Control 2 | Control 3 | Control 4 | Control 5 | Control 6 | Control 7 |
| ABS-1 | 30 | 30 | 30 | 35.5 | 35.5 | 35.5 | 30 | 30 |

TABLE 1-continued
EFFECT OF VARYING RUBBER COMPOSITION

|  | Ex 1 | Control 1 | Control 2 | Control 3 | Control 4 | Control 5 | Control 6 | Control 7 |
|---|---|---|---|---|---|---|---|---|
| Terpolymer-1 (0.9 mole percent MA) | 6 | 6 | 6 | 6 | 6 | 6 | 6 | 6 |
| Nylon-1 | 56 | 56 | 56 | 52.5 | 52.5 | 52.5 | 56 | 56 |
| Rubber |  |  |  |  |  |  |  |  |
| 1 | 8 |  |  |  |  |  |  |  |
| 2 |  | 8 |  |  |  |  |  |  |
| 3 |  |  | 8 |  |  |  |  |  |
| 4 |  |  |  | 6 |  |  |  |  |
| 5 |  |  |  |  | 6 |  |  |  |
| 6 |  |  |  |  |  | 6 |  |  |
| 7 |  |  |  |  |  |  | 8 |  |
| 8 |  |  |  |  |  |  |  | 8 |
| Izod | 1092 | 112 | 84.1 | 167 | 565 | 632 | 152 | 125 |
| Total Rubber | 20 | 20 | 20 | 20 | 20 | 20 | 20 | 20 |

TABLE 2
EFFECT OF DIFFERENT ACID-CONTAINING ACRYLIC COPOLYMER RUBBERS

|  | Ex 2 | Ex 3 | Ex 4 | Ex 5 |
|---|---|---|---|---|
| ABS-1 | 30 | 30 | 30 | 30 |
| Terpolymer-1 (0.9 mole percent MA) | 3 | 3 | 3 | 3 |
| Nylon-1 | 59 | 59 | 59 | 59 |
| Rubber |  |  |  |  |
| 1 | 8 |  |  |  |
| 9 |  | 8 |  |  |
| 10 |  |  | 8 |  |
| 11 |  |  |  | 8 |
| Izod, 1.27 × 0.64 cm at |  |  |  |  |
| Room Temp. | 1106 | 879 | 879 | 879 |
| 10° C. | 1068 | 613 | 281 | 705 |
| 0° C. | 949 | 291 | 485 | 312 |
| −10° C. | 357 | 217 | 257 | 303 |

TABLE 3
EFFECT OF DIFFERENT NYLON COMPOSITIONS

|  | Ex 6 | Ex 7 | Ex 8 | Ex 9 | Ex 10 |
|---|---|---|---|---|---|
| ABS-1 | 30 | 30 | 30 | 30 | 30 |
| Terpolymer-1 (0.9 mole percent MA) | 6 | 6 | 6 | 6 | 6 |
| Nylon-1 | 56 |  |  |  |  |
| Nylon-2 |  | 56 |  |  |  |
| Nylon-3 |  |  | 56 |  |  |
| Nylon-4 |  |  |  | 56 |  |
| Nylon-5 |  |  |  |  | 56 |
| Rubber-2 | 8 | 8 | 8 | 8 | 8 |
| Total Rubber | 20 | 20 | 20 | 20 | 20 |
| Izod | 954 | 830 | 944 | 738 | 797 |
| Tensile Yield | 43.1 | 44.6 | 41.4 | 40.9 | 37.6 |
| Flex Modulus | 1805 | 2115 | 1640 | 1957 | 1461 |

TABLE 4
EFFECT OF A VARYING AMOUNT OF FUNCTIONALIZED RUBBER ON TOUGHNESS

|  | Control 8 | Ex 11 | Ex 12 | Ex 13 | Control 9 |
|---|---|---|---|---|---|
| ABS-1 | 52 | 38 | 30 | 13 | 0 |
| Terpolymer-1 (0.9 mole percent MA) | 6 | 6 | 6 | 6 | 6 |
| Nylon-1 | 42 | 51 | 56 | 66 | 74 |
| Rubber-1 | 0 | 5 | 8 | 15 | 20 |
| Total Rubber | 20 | 20 | 20 | 20 | 20 |
| No. of Blows to Fail |  |  |  |  |  |
| at 1.59 J/cm | 11 | 17 | 17 | 18 | 10 |
| at 2.12 J/cm | 7 | 10 | 10 | 11 | 5 |
| Izod at 23° C. | 571 | 925 | 1017 | 1148 | 625 |

TABLE 5
EFFECT OF VARYING AMOUNT OF FUNCTIONALIZED RUBBER

|  | Control 10 | Ex 14 | Ex 15 | Ex 16 | Ex 17 | Ex 18 | Ex 19 | Control 11 |
|---|---|---|---|---|---|---|---|---|
| ABS-1 | 50 | 40 | 37 | 35 | 30 | 25 | 12 | 0 |
| Terpolymer-1 (0.9 mole percent MA) | 6 | 6 | 6 | 6 | 6 | 6 | 6 | 6 |
| Nylon-1 | 44 | 50 | 52 | 53 | 56 | 59 | 67 | 74 |
| Rubber-1 | 0 | 4 | 5 | 6 | 8 | 10 | 15 | 20 |
| Total Rubber | 20 | 20 | 20 | 20 | 20 | 20 | 20 | 20 |
| Izod |  |  |  |  |  |  |  |  |
| at 23° C. | 480 | 516 | 566 | 882 | 944 | 947 | 953 | 578 |
| at 40° C. | 880 | — | 977 | — | — | — | — | 977 |
| Tensile Yield | — | 42.8 | 42.5 | 42.8 | 43.4 | 42.5 | 41.6 | 45.7 |
| % Elongation @ Fail | — | 261 | 263 | 291 | 288 | 273 | 358 | 264 |

TABLE 6
EFFECT OF VARYING AMOUNT OF FUNCTIONALIZED RUBBER

|  | Control 10 | Ex 16 | Ex 20 | Ex 21 | Ex 22 |
|---|---|---|---|---|---|
| ABS-1 | 50 | 35 | 33 | 28 | 23 |
| Terpolymer-1 (0.9 mole percent MA) | 6 | 6 | 6 | 6 | 6 |
| Nylon-1 | 44 | 53 | 56 | 56 | 56 |
| Rubber-1 | 0 | 6 | 5 | 10 | 15 |
| Total Rubber | 20 | 20 | 18.2 | 21.2 | 26.2 |
| Izod at 23° C. | 480 | 882 | 926 | 1060 | 1120 |

TABLE 7
EFFECT OF DIFFERENT ABS COMPOSITIONS

|  | Ex 23 | Ex 24 | Control 12 | Ex 25 | Ex 26 |
|---|---|---|---|---|---|
| ABS-1 | 50 | 50 |  |  |  |
| ABS-2 |  |  | 35 |  |  |

TABLE 7-continued
EFFECT OF DIFFERENT ABS COMPOSITIONS

|  | Ex 23 | Ex 24 | Control 12 | Ex 25 | Ex 26 |
|---|---|---|---|---|---|
| ABS-3 |  |  |  | 31 |  |
| ABS-4 |  |  |  |  | 33 |
| Terpolymer-1 (0.9 mole percent MA) | 6 | 6 | 3 | 3 | 3 |
| Nylon-1 | 36 | 40 | 54 | 58 | 56 |
| Rubber-1 | 8 | 4 | 8 | 8 | 8 |
| Total Rubber | 25 | 23 | 20 | 20 | 20 |
| Izod Impact | 911 | 905 | 287 | 1076 | 1028 |

TABLE 8
EFFECT OF VARYING AMOUNT OF TERPOLYMER IN BLENDS

|  | Control 13 | Ex 27 | Ex 28 | Ex 29 | Ex 30 | Ex 31 | Ex 32 | Ex 33 | Ex 34 | Ex 35 |
|---|---|---|---|---|---|---|---|---|---|---|
| ABS-1 | 30 | 30 | 30 | 30 | 30 | 30 | 30 | 30 | 30 | 30 |
| Terpolymer-1 (0.9 mole percent MA) | 0 | 0.5 | 1.0 | 1.5 | 2.0 | 3.0 | 5.0 | 6.0 | 8.0 | 10.0 |
| Nylon-1 | 62 | 61.5 | 61 | 60.5 | 60 | 59 | 57 | 56 | 54 | 52 |
| Rubber-1 | 8 | 8 | 8 | 8 | 8 | 8 | 8 | 8 | 8 | 8 |
| Total Rubber | 20 | 20 | 20 | 20 | 20 | 20 | 20 | 20 | 20 | 20 |
| Izod Impact | 234 | 683 | 922 | 944 | 960 | 944 | 927 | 900 | 841 | 732 |

TABLE 9
EFFECT OF VARYING AMOUNT OF MALEIC ANHYDRIDE IN TERPOLYMER

|  | Control 14 | Ex 36 | Ex 37 | Ex 38 | Ex 39 | Ex 40 |
|---|---|---|---|---|---|---|
| ABS-1 | 30 | 30 | 30.4 | 30 | 30 | 30 |
| Nylon-1 | 59 | 59 | 58.4 | 59 | 58.9 | 59 |
| Rubber-1 | 8 | 8 | 8.2 | 8 | 8.1 | 8 |
| Terpolymer-1 | 3 | 3 | 3.0 | 3.0 | 3.0 | 3 |
| Mole percent MA in Terpolymer | 0 | 0.18 | 0.45 | 0.9 | 1.35 | 4.5 |
| Izod | 242 | 884 | 1051 | 960 | 1094 | 686 |

TABLE 10
EFFECT OF VARYING AMOUNT OF MALEIC ANHYDRIDE IN TERPOLYMER

|  | Ex 41 | Control 15 | Ex 42 | Ex 43 | Ex 44 | Ex 45 | Control 16 |
|---|---|---|---|---|---|---|---|
| ABS-1 | 30 | 30 | 30 | 30 | 30 | 30 | 30 |
| Terpolymer-1 | 3 | — | — | — | — | — | — |
| Terpolymer-2 | — | 3 | 1 | 0.5 | 0.2 | 0.1 | 0 |
| Mole percent MA in Terpolymer | 0.9 | 22 | 22 | 22 | 22 | 22 | 0 |
| Nylon-1 | 59 | 59 | 61 | 61.5 | 61.8 | 61.9 | 62 |
| Rubber-1 | 8 | 8 | 8 | 8 | 8 | 8 | 8 |
| Total Rubber | 20 | 20 | 20 | 20 | 20 | 20 | 20 |
| Izod Impact | 1163 | 160 | 324 | 681 | 1123 | 1064 | 235 |

TABLE 11
EFFECT OF VARYING THE ACRYLONITRILE-MALEIC ANHYDRIDE CONTENT OF COMPONENT (D)

|  | Component (D) Composition | | | Component D Concentration in Polyblend | Maleic Anhydride Content of Polyblend, mole per 100 parts by | Polyblend Izod |
|---|---|---|---|---|---|---|
|  | AN, wt. % | MA, wt. % | MA + AN, wt. % | wt. % | weight | J/m notch |
| Example | | | | | | |
| 46 | 35.6 | 1.0 | 36.6 | 3 | .0003 | 1090 |
| 47 | 32.6 | 1.0 | 33.6 | 3 | .0003 | 1050 |
| 48 | 21.0 | 1.0 | 30.1 | 3 | .0003 | 1070 |
| 49 | 16.9 | 1.0 | 17.9 | 3 | .0003 | 1060 |
| Control | | | | | | |
| 17 | 0 | 8.0 | 8.0 | 0.1 | .00008 | 146 |
| 18 | 0 | 8.0 | 8.0 | 0.2 | .00016 | 130 |
| 19 | 0 | 8.0 | 8.0 | 0.3 | .00024 | 146 |
| 20 | 0 | 8.0 | 8.0 | 0.6 | .00048 | 630 |
| 21 | 0 | 8.0 | 8.0 | 1.0 | .0008 | 277 |

We claim:

1. A polymer blend comprising:
   (A) a graft rubber composition comprising from 5 to 80 weight percent of a substrate rubber having a glass transition temperature below 0° C. and from 95 to 20 weight percent of monomers comprising per 100 parts by weight of the monomers from 20 to 75 parts by weight of a vinyl aromatic monomer and from 80 to 25 parts by weight of polar monomer selected from the group consisting of $C_1$ to $C_4$ alkyl (meth)-acrylate and (meth)-acrylonitrile, said monomers having been polymerized in the presence of and grafted on to the substrate rubber;
   (B) a polyamide;
   (C) an acid-containing ethylene/alkyl acrylate copolymer rubber having a glass transition temperature below 0° C., said rubber consisting of ethylene, $C_1$ to $C_4$ alkyl acrylate and 0.5 to 25 mole percent of an interpolymerized acid-containing monomer selected from (meth)-acrylic acid, a dicarboxylic acid or annhydride or a $C_1$ to $C_{12}$ monoalkyl ester of a dicarboxylic acid; and (D) an effective amount of an acid-containing terpolymer to improve the impact resistance of the polymer blend comprising components (A), (B) and (C), said acid-containing terpolymer having a glass transition temperature above 0° C. and consisting of a vinyl aromatic monomer, a polar monomer selected from the group consisting of $C_1$ to $C_4$ alkyl (meth)arcylate and (meth) acrylonitrile and from about 0.05 to about 50 mole percent of acid functional comonomer units selected from (meth)acrylic acid, a dicarboxylic acid or anhydride or a $C_1$ to $C_{12}$ monoalkyl ester of a dicarboxylic acid;

wherein the weight ratio of component (A) to component (B) is in the range of about 1:9 to about 9:1, wherein the sum of components (A) and (B) is at least about 60 weight percent of the polymer blend and wherein the amount of component (C) is in the range of 1 to 18 weight percent of the polymer blend and the amount of component (D) is in the range of 0.05 to 20 weight percent.

2. The polymer blend of claim 1 wherein the substrate rubber is polybutadiene or a butadiene copolymer and the monomers grafted thereto are styrene and (meth)-acrylonitrile or methyl methacrylate.

3. The polymer blend of claim 1 wherein the graft monomers of component (A) comprise 25 to 50 parts by weight of acrylonitrile and 50 to 75 parts by weight of a vinyl aromatic monomer per 100 parts by weight of the monomers.

4. The polymer blend of claim 1 wherein component (B) is nylon 6, nylon 6,6 or a copolymer of nylon 6,6 and nylon 6.

5. The polymer blend of claim 1 wherein component (D) contains 0.1 to 30.0 mole percent of the acid functional comonomer.

6. The polymer blend of claim 5 wherein the total weight percent of acid comonomer and polar monomers of component (D) is equal to the total weight percent of polar monomers of component (A) ±12 percentage units, and wherein the total weight percent of acid comonomer and polar monomers of component (D) is at least 15 weight percent of component (D).

7. The polymer blend of claim 6 wherein the total weight percent of acid comonomer and polar monomers of component (D) is equal to the weight percent of polar monomers of component (A) ±7 percentage units.

8. The polymer blend of claim 6 wherein except for the acid comonomer of component (D), the monomers of component (D) are identical to the monomers of component (A).

9. The polymer blend of claim 6 wherein the concentration of acid functional monomer units provided by component (D) is in the range of 0.00003 to about 0.005 mole per 100 parts by weight of polyblend.

10. The polymer blend of claim 6 wherein component (D) is a terpolymer of styrene, acrylonitrile and maleic anhydride and the maleic anhydride comprises 0.1 to 3.0 mole percent of the terpolymer.

11. The polymer blend of claim 10 wherein the maleic anhydride comprises about 1 mole percent of the terpolymer.

12. The polymer blend of claim 6 wherein component (D) is a terpolymer of styrene, methyl methacrylate and maleic anhydride and the maleic anhydride comprises from about 15 to 25 mole percent of the terpolymer.

13. The polymer blend of claim 12 wherein the maleic anhydride comprises about 22 mole percent of the terpolymer.

14. The polymer blend of claim 6 wherein component (C) is a copolymer comprising at least 50 mole percent ethylene, about 0.5 to about 10 mole percent acrylic acid or monoethyl maleate and about 10 to 49.5 mole percent $C_1$ to $C_4$ alkyl acrylate.

15. The polymer blend of claim 14 wherein component (C) provides from 5 to 15 weight percent of the polyblend.

16. A shaped article prepared from a polymer blend according to claim 1.

* * * * *